(No Model.)

I. E. STOREY.
ELECTRIC MOTOR.

No. 488,041. Patented Dec. 13, 1892.

WITNESSES:
Frank S. Ober.
James F. Kavanagh.

INVENTOR
Imle E. Storey
BY
M. A. Rosenbaum
ATTORNEY.

United States Patent Office.

IMLE E. STOREY, OF BOULDER, COLORADO, ASSIGNOR TO THE STOREY ELECTRIC DRILL AND POWER COMPANY.

ELECTRIC MOTOR.

SPECIFICATION forming part of Letters Patent No. 488,041, dated December 13, 1892.

Original application filed February 4, 1892, Serial No. 422,633. Divided and this application filed June 9, 1892. Serial No. 436,054.

(No model.)

*To all whom it may concern:*

Be it known that I, IMLE E. STOREY, a citizen of the United States, residing at Boulder, in the county of Boulder and State of Colorado, have invented certain new and useful Improvements in Electric Motors, of which the following is a full, clear, and exact description.

This invention relates to electric motors; and the object is to provide a construction which shall be as compact and symmetrical as possible, simple, efficient, and protected from external injury.

The invention consists of the construction which will be hereinafter described and claimed.

Figure 1:
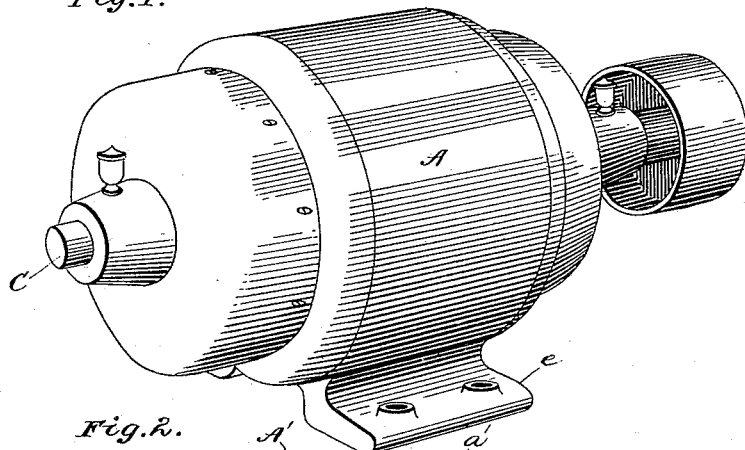
Figure 2:
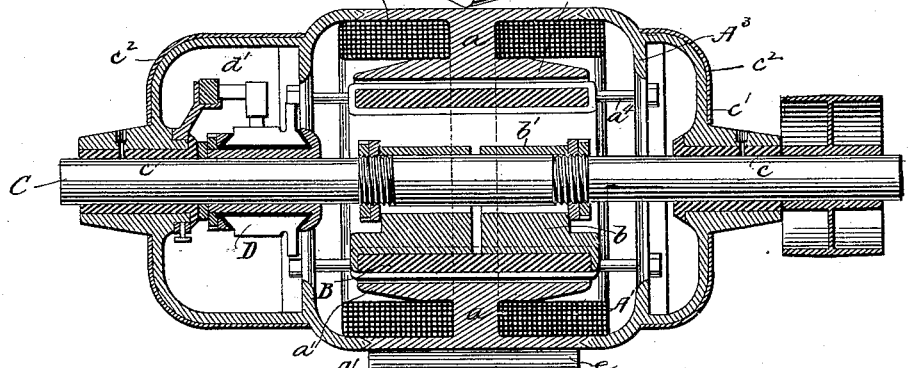
Figure 3:
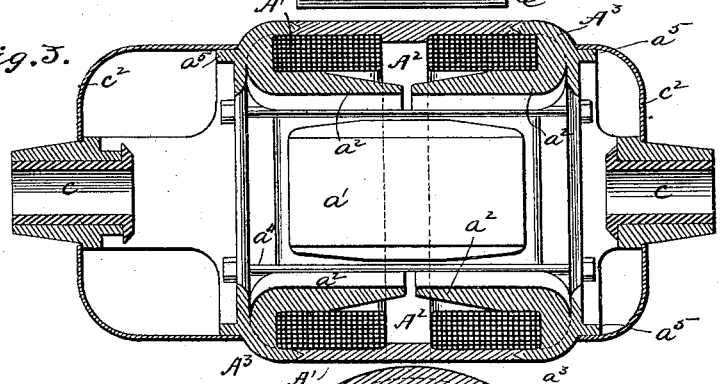
Figure 4:
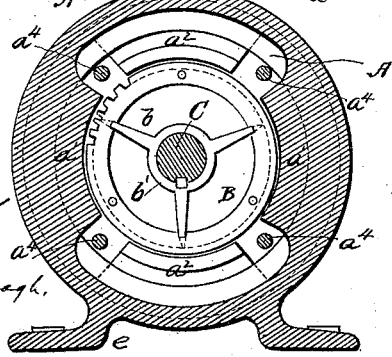

In the accompanying drawings, Figure 1 is a perspective view of the motor. Fig. 2 is a longitudinal section of the same. Fig. 3 is a similar section, but taken at right angles to Fig. 2 and with the armature removed; and Fig. 4 is a transverse section.

The general exterior appearance of the motor is tubular or cylindrical, the middle portion A constituting a part of the field-magnet. Inside of the cylinder and close against its interior walls are located two field-magnet coils $A'A'$, which are separated from each other by a short space $A^2$. At points diametrically opposite each other are formed inward radial projections $a$ from the cylinder, which pass between two coils, and the inner ends of these have lateral projections $a'a'$, forming a T, which extends across the full width of the coils $A'$. These constitute two of the field-magnet pole-pieces, and their inner surfaces are cylindrical in shape and parallel to the axis of the motor. At points ninety degrees from each of these pole-pieces are formed other pole-pieces $a^2$, which are continuations of the end of the cylinder, formed around the outer edges of the coils and extending inward toward each other until they nearly meet at a point in the middle of the space $A^2$. Each pair of these formations $a^2$ constitute another pole-piece of the motor. The pairs are placed diametrically opposite each other and alternate at equal distances around the interior of the cylinder with the pole-pieces $a^2$. For convenience in the construction the pole-pieces $a^2$ are cast or otherwise formed upon rings $A^3$, which are closely fitted to the cylinder A at the points $a^3 a^3$. These rings have inward radial flanges, as shown, which are connected together by brass bolts $a^4$, which rigidly hold the cylinder and the rings together as one structure. Small flanges $a^5$ are also formed upon the rings, for a purpose which will hereinafter appear. The electric current is to be passed through the coils $A'A'$ in such directions as will produce magnetic polarity of one sign in all of the pole-pieces $a'$ and a polarity of the opposite sign in all of the pole-pieces $a^2$. The motor is therefore a four-pole machine, the magnetic circuit being from one pole-piece through the armature to the other, around the coils, and through the outer cylinder.

The armature B of the machine may be of any approved type. I have shown it as a Gramme ring supported by a three-arm spider $b$. The latter is keyed to a tube or sleeve $b'$ upon the armature-shaft C. The shaft has its bearings in boxes $c$, formed in arms or heads $c'$, cast upon or bolted to the end rings $A^3$, and these arms or heads are covered by cup-shaped castings or parts $c^2$, the edges of which are riveted or screwed to the flanges $a^5$ on rings $A^3$, and the center is open to embrace the box $c$. These parts $c^2$ therefore entirely inclose the ends of the motor, and together with the cylinder of the field-magnet, constitute a water and dust proof housing for all the moving and delicate parts. One of the end housings is made longer than the other and covers the commutator D and brush-holder $d$, which are located on the shaft and box $c$, respectively.

As a stationary motor, the field-magnet cylinder should have formed upon it the feet $e$; but for street-car or locomotive work the cylinder is perfectly plain. Although I have described a four-pole motor, it is obvious the invention applies to any multipolar machine.

This application is a division of my application filed February 24, 1892, Serial No. 422,633.

Having thus described my invention, I claim—

1. In an electric motor, a field-magnet consisting of a cylinder surrounding a coil or coils of wire, in combination with pole-pieces extending from opposite points at the edges of the cylinder around the coil or coils and toward each other, and other pole-pieces extending inward from a point or points about midway between the edges of the cylinder and extending in both directions toward the edges of the cylinder and embracing the coils, substantially as described.

2. The combination, with an armature, of a multipolar field-magnet consisting of a cylinder surrounding the armature and having pole-pieces projecting from its edges inward and other pole-pieces projecting from its middle portion inward, the different pole-pieces alternating with one another around the armature, and exciting-coils confined between the cylinder and the pole-pieces.

3. The combination, with the cylinder A, provided with one set of pole-pieces, of the end rings provided with the inward projections, constituting the other set of pole-pieces, as set forth.

4. The combination, with the cylinder A, provided with one set of pole-pieces, of the end rings provided with the inward projections constituting the other set of pole-pieces, and bolts, as $a^4$, connecting the two rings and securing them to the cylinder, substantially as described.

In testimony whereof I subscribe my signature in presence of two witnesses.

IMLE E. STOREY.

Witnesses:
FRANK S. OBER,
JAMES F. KAVANAGH.